United States Patent
Klaver et al.

(10) Patent No.: US 6,880,567 B2
(45) Date of Patent: Apr. 19, 2005

(54) OVER-PRESSURE PROTECTION SYSTEM

(75) Inventors: Theodorus Cornelis Klaver, Rijswijk (NL); Mark Pettitt, Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/494,099

(22) PCT Filed: Nov. 1, 2002

(86) PCT No.: PCT/EP02/12279

§ 371 (c)(1),
(2), (4) Date: Apr. 30, 2004

(87) PCT Pub. No.: WO03/038325

PCT Pub. Date: May 8, 2003

(65) Prior Publication Data

US 2004/0261856 A1  Dec. 30, 2004

(30) Foreign Application Priority Data

Nov. 1, 2001 (EP) .............................. 01309291

(51) Int. Cl.⁷ .................... F16K 37/00; G01M 19/00
(52) U.S. Cl. .................. 137/487.5; 137/461; 137/557; 73/168
(58) Field of Search ............... 137/461, 487.5, 137/557; 73/168

(56) References Cited

U.S. PATENT DOCUMENTS 3,844,310 A    10/1974  Brindisi
4,572,237 A     2/1986  Thompson
5,329,465 A  *  7/1994  Arcella et al. .............. 702/184
5,836,348 A    11/1998  Ostand
6,123,093 A     9/2000  D'Antonio, et al.
6,131,609 A  * 10/2000  Metso et al. ................ 137/552

FOREIGN PATENT DOCUMENTS

GB          2062812        5/1981  ........... F16K/17/00

OTHER PUBLICATIONS

International Search Report dated Feb. 12, 2003.

* cited by examiner

*Primary Examiner*—Ramesh Krishnamurthy
(74) *Attorney, Agent, or Firm*—William E. Hickman

(57) ABSTRACT

An over-pressure protection system having a conduit section extending between a pressure reduction valve and a low-pressure fluid handling system, a shut-off valve provided with an actuator arranged in the conduit section, pressure sensors arranged one on either side of the shut-off valve in the conduit section, a safety control system that communicates with the actuator and the pressure sensors which produces a signal when it detects a high pressure in the conduit section, and a self-diagnostic system for checking the shut-off valve and the pressure sensors that communicates with the actuator, the pressure sensors and the safety control system, which self-diagnostic system produces a signal when it detects a failure in either the shut-off valve or the pressure sensors or both.

11 Claims, 1 Drawing Sheet

OVER-PRESSURE PROTECTION SYSTEM

The present application claims priority on European Patent Application 01309291.1 filed on 01 Nov. 2001.

FIELD OF THE INVENTION

The invention relates to an over-pressure protection system. The over-pressure protection system protects a facility for handling fluid at a low pressure, such as a pipeline or a plant, from becoming exposed to an over-pressure. An over-pressure is a pressure that exceeds the pressure maximum allowable operating pressure of the facility for handling low-pressure fluids.

The facility is connected to the source of high pressure by a conduit. To control the fluid pressure in the facility, a pressure reduction valve is arranged in the conduit. To protect the facility from over-pressures, the over-pressure protection system is provided in the conduit downstream of the pressure reduction valve.

The over-pressure protection system protects the low-pressure facility from over-pressures caused by failure of the upstream pressure reduction system. In addition it protects the facility from over-pressures resulting from closing the fluid flow in the downstream low-pressure facility. A failure of the over-pressure protection system would cause the pressure in the low-pressure facility to become equal to the high pressure of the upstream fluid source.

BACKGROUND OF THE INVENTION

A conventional over-pressure protection system comprises a shut-off valve that closes if the pressure in the low-pressure handling system exceeds a predetermined value, and a mechanical relief valve that opens if the pressure in the low-pressure handling system exceeds a predetermined value to protect against failures of the shut-off valve. A disadvantage of the conventional over-pressure protection system is that the high-pressure source remains connected to the low-pressure handling system in case the shut-off valve fails and the mechanical relief valve opens. Moreover, Applicant had studied the reliability of such a relief valve, and found that the number of failures per unit of time was considerable, more than 5 failures in 1000 years of service life.

SUMMARY OF THE INVENTION

To this end, the over-pressure protection system according to the present invention comprises a conduit section extending between a pressure reduction valve and a low-pressure fluid handling system, a shut-off valve provided with an actuator arranged in the conduit section, pressure sensors arranged one on either side of the shut-off valve in the conduit section, a safety control system that communicates with the actuator and the pressure sensors which produces a signal when it detects a high pressure in the conduit section, and a self-diagnostic system for checking the shut-off valve and the pressure sensors that communicates with the actuator, the pressure sensors and the safety control system, which self-diagnostic system produces a signal when it detects a failure in either the shut-off valve or the pressure sensors or both.

BRIEF DESCRIPTION OF THE DRAWING

The FIGURE is a hydraulic schematic of the present invention.

DETAILED EMBODIMENT OF THE INVENTION

Figure 1:
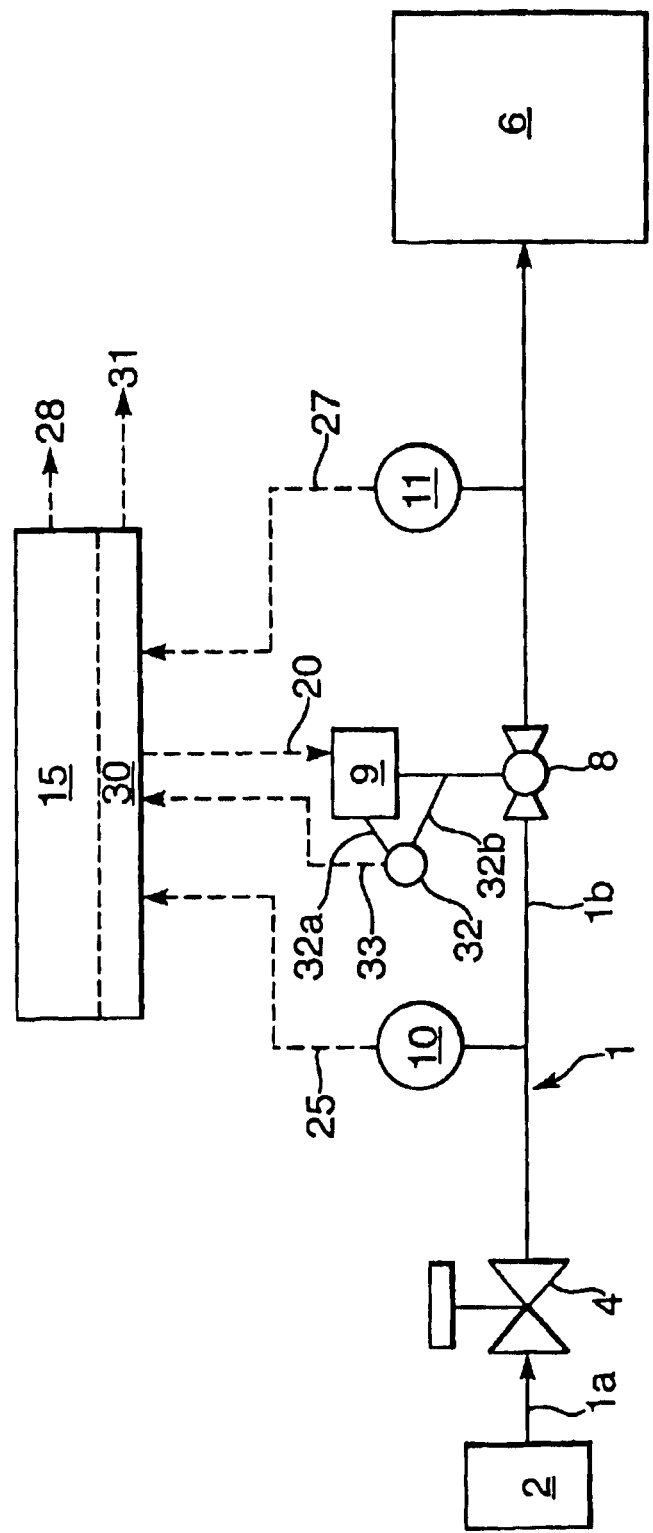

The invention will now be described in more detail with reference to the accompanying drawing, which shows schematically a conduit 1, which conduit 1 comprises a first conduit section 1a extending from a source 2 of high pressure to a pressure reduction valve 4, and a second conduit section 1b extending from the pressure reduction valve 4 to a low-pressure fluid handling system 6.

In the second conduit section 1b is arranged a shut-off valve 8 provided with an actuator 9. The shut-off valve 8 is for example a ball valve. In addition pressure sensors 10 and 11 are arranged on either side of the shut-off valve 8 in the conduit section 1b.

The over-pressure protection system further comprises a safety control system 15 that instructs the actuator 9 via conduit 20. The safety control system 15 further communicates with the sensors 10 and 11 via conduits 25 and 27 transmitting sensor signals to the safety control system 15. Suitably, the conduits 20, 25 and 27 are conduits that transmit electric signals. However the conduits may as well transmit hydraulic or mechanical signals, or they can be replaced by a communication system based on radio signals. The safety control system 15 produces a signal 28 when it detects a high pressure in the conduit section 1.

During normal operation, the safety control system 15 will cause the shut-off valve 8 arranged in the conduit section 1b to remain in an open position as long as the pressure sensors 10 and 11 sense a pressure that is below a predetermined value. However, if any one of the pressure sensors 10 and 11 senses a pressure that exceeds the predetermined value, the safety control system 15 will cause the actuator 9 to close the shut-off valve 8. In this way the low-pressure facility is protected from an over-pressure. In addition a warning signal is given to an operator, and suitably, this warning signal will also cause interrupting the operation of the low-pressure fluid handling system. In case the low-pressure fluid handling system is a pipeline, the pipeline will be closed, and in case the low-pressure fluid handling system is a plant, operation of the plant will be interrupted.

The safety control system 15 can directly power the actuator 9, or it can instruct a separate power source to power the actuator 9.

The over-pressure protection system further comprises a self-diagnostic system 30, for checking the shut-off valve 8 and the pressure sensors 10 and 11. The self-diagnostic system 30 produces a signal 31 when it detects a failure in either the shut-off valve 8 or the pressure sensors 10 and 11 or both the shut-off valve 8 and the pressure sensors 10 and 11. The signal 31 is given to an operator, and suitably, this signal 31 will also cause interrupting the operation of the low-pressure fluid handling system within a predefined time. In case the low-pressure fluid handling system is a pipeline, the pipeline will be closed, and in case the low-pressure fluid handling system is a plant, operation of the plant will be interrupted. The self-diagnostic system 30 communicates with the safety control system 15, with the actuator 9 and with the pressure sensors 10 and 11. The communication with the actuator 9 and with the pressure sensors 10 and 11 is via the same conduits as the safety control system 15. Alternatively, this communication is done via the safety control system 15. In case an instruction is sent to the actuator via conduit 20, the instruction is added to an instruction from the safety control system 15, in such a way that, in case of an emergency, the instruction from the safety control system 15 overrules any instruction from the self-diagnostic system 30. Information on power supplied to the actuator 9 and the position of the valve body (not shown) is sensed by sensor combination 32 connected to the actuator by conduit 23a and to the valve stem by conduit 32b. The information is provided to the self-diagnostic system via conduit 33. Suitably, conduit 33 is a conduit that transmits electric signals, however, the conduit may as well transmit hydraulic or mechanical signals, or it can be replaced by a communication system based on radio signals.

It will be understood that an unreliable over-pressure protection system is undesirable. The self-diagnostic system 30 produces a signal 31 when it detects a failure in either the shut-off valve 8 or the pressure sensors 10 and 11 or in both. In order to detect a failure, the self-diagnostic system 30 is programmed to carry out sequentially several tests. The self-diagnostic system 30 increases considerably the reliability of the over-pressure protection system.

The self-diagnostic system 30 is suitably programmed so that it carries out a test of the over-pressure protection system, which is designed to test the correct performance of the pressure sensors 10 and 11, the actuated shut-off valve 8 and the communication lines that extend between the sensors 10 and 11, the actuator 9, and the safety control system 15.

The system test comprises the steps of: displacing the valve body (not shown) of the shut-off valve 8 so as to start closing the shut-off valve 8; recording the pressures measured by the pressure sensors 10 and 11 upstream and downstream of the shut-off valve 8; stopping displacing the valve body when the pressure difference across the shut-off valve 8 is greater than a predetermined limit and the upstream pressure is the greater than the downstream pressure; and then re-opening the shut-off valve 8.

In the first step of this test, the self-diagnostic system 30 causes via conduit 20 displacing the actuator 9 to start to displace the valve body so as to close the shut-off valve 8. If the chain that includes sending the instruction to close the shut-off valve 8, executing the instruction and sensing the effect of closing the shut-off valve 8 is functioning properly, the upstream sensor 10 will start to measure an increasing pressure that is larger than the pressure measured by the downstream pressure sensor 11. The pressure signals are passed on via conduits 25 and 27 to the self-diagnostic system 30. When the pressure difference across the shut-off valve 8 is greater then a predefined limit and the upstream pressure sensed by sensor 10 is greater than the downstream pressure sensed by sensor 11, the self-diagnostic system 30 instructs to stop displacing the valve body of the shut-off valve 8, and to then re-open the shut-off valve 8. The predefined limit is so selected that the pressure difference across the shut-off valve 8 does not adversely affect the operation of the low-pressure fluid handling system 6. In case no pressure difference is sensed, a signal 31 is given to indicate that parts of the chain are faulty.

During the system test the self-diagnostic system 30 senses and records the displacement of the valve body and the power supplied to the actuator 9 and compares them with the expected displacement and power. In this step all functions of the shut-off valve 8 and the pressure sensors 10 and 11 upstream and downstream of the valve 8 are checked.

The self-diagnostic system 30 produces a signal 31 indicating that either the test was either successful indicating that the shut-off valve displacement and power supplied to the actuator compared favourably with what which was expected or the test was unsuccessful indicating that that the shut-off valve displacement and power did not compare favourably with that which was expected. To this end the self-diagnostic system 30 is further programmed to carry out the steps of: causing the actuator 9 to displace the valve body of the shut-off valve 8; comparing the displacement of the valve body and power supplied to the actuator 9 with the expected displacement and power; and giving a signal 31 if either the displacement or the power is not as expected. The self-diagnostic system 30 causes the actuator 9 to displace so as to close the shut-off valve 8, by powering the actuator 9. The power supplied to the actuator and the position of the valve body is recorded by sensor combination 32 and via conduit 33 the information is provided to the self-diagnostic system 30. The self-diagnostic system 30 gives a signal 31 if either the displacement or the power is not as expected. This test is a valve test.

It will be understood that if the shut-off valve 8 is electrically actuated, the current that flows to the actuator can be used, instead of the power. And if the actuator is an actuator powered by a fluid, such as air, the pressure of the fluid is used. The current or the pressure are sensed by sensor combination 32 and provided to the self-diagnostic system 30 through the conduit 33.

In the valve test, displacing the valve body can be done over part of the stroke of the valve body of the shut-off valve 8, or over the full stroke of the valve body of the shut-off valve 8.

In addition to this periodic test of the over-pressure protection system, the pressure sensors 10 and 11 are continuously monitored by the self-diagnostic system 30, when the shut-off valve 8 is in the open position system. To carry out this sensor test, the self-diagnostic system 30 is further programmed to carry out the steps of: measuring continuously the pressures with the pressure sensors 10 and 11; calculating the pressure difference; and giving a signal 31 if the difference is greater than a predefined limit. This test is suitably carried out continuously as long as the shut-off valve 8 is open, and provides a check on the pressure sensors 10 and 11. The signals of the pressure sensors 10 and 11 are passed on to the self-diagnostic system 30 via conduits 25 and 27, respectively. The pressure difference is calculated and the pressure sensors 10 and 11 work correctly if the absolute value of the pressure difference is smaller than a predefined limit. However, if that is not the case, a signal 31 is given to indicate that a failure is detected in the pressure sensors 10 or 11. In addition the shut-off valve 8 is closed within a predefined time, unless the failure is remedied, in order to shutdown the low-pressure facility. It will be understood that small variations in the flow through the conduit section 1 will cause a pressure drop over the shut-off valve 8, and that, when defining the predefined limit, this pressure drop should be taken into account.

The system test and the valve test can be carried out one after the other in a round of tests with regular intervals between rounds of tests, wherein the sensor test is done continuously in the interval between two rounds of tests. Alternatively, each test can be carried out at regular intervals, wherein the time between two tests differs for each of the tests.

In the FIGURE we have a self-diagnostic system 30 that part of the safety control system 15. However, the self-diagnostic system can be separate from the safety control system, provided that the communication is lines are so connected that the above-described functionality is maintained.

In the embodiment of the invention as discussed with reference to the FIGURE, the conduit section 1 contained a single shut-off valve 8 provided with an upstream pressure sensor 10 and a downstream pressure sensor 11. Alternatively, the conduit section 1 can be provided with two or more shut-off valves in series, each having an upstream pressure sensor and a downstream pressure sensor. In case there are two pressure sensors between two adjacent shut-off valves, one of the two pressure sensors can be omitted so that the downstream pressure sensor of the one shut-off valve is the upstream pressure sensor of the other shut-off valve. The above-described tests are then carried out for the two or more valves individually. The shut-off valves can have their own self-diagnostic system and a common safety control system, or a safety control system for each shut-off valve. Alternatively, the shut-off valves can have one self-diagnostic system and one safety control system works on all the shut-off valves.

In summary the present invention provides an over-pressure protection system with an increased reliability so that there is no need for a pressure relief system. A configuration wherein the over-pressure protection systems according to the present invention comprises two shut-off valves can achieve a failure rate of less than once in the 50,000 years of service life of the over-pressure protection systems.

While the illustrative embodiments of the invention have been described with particularity, it will be understood that various other modifications will be readily apparent to, and can be easily made by one skilled in the art without departing from the spirit of the invention. Accordingly, it is not intended that the scope of the following claims be limited to the examples and descriptions set forth herein but rather that the claims be construed as encompassing all features which would be treated as equivalents thereof by those skilled in the art to which this invention pertains.

What is claimed is:

1. An over-pressure protection system comprising a conduit section extending between a pressure reduction valve and a low-pressure fluid handling system, a shut-off valve provided with an actuator arranged in the conduit section, pressure sensors arranged one on either side of the shut-off valve in the conduit section, a safety control system that communicates with the actuator and the pressure sensors and produces a signal when it detects a high pressure in the conduit section, and a self-diagnostic system for checking the shut-off valve and the pressure sensors that communicates with the actuator, the pressure sensors and the safety control system, which self-diagnostic system produces a signal when it detects a failure in either the shut-off valve or the pressure sensors or both.

2. The over-pressure protection system according to claim 1, wherein the signal is a warning signal to an operator in case of a failure.

3. The over-pressure protection system according to claim 1, wherein the signal will also cause interrupting the operation of the low-pressure fluid handling system within a predefined time.

4. The over-pressure protection system according to claim 1, wherein the self-diagnostic system is programmed to carry out, when the shut-off valve is fully open, the steps of: measuring continuously the pressures with the pressure sensors; calculating the pressure difference; and giving a signal if the difference is greater than a predefined limit.

5. The over-pressure protection system according to claim 4, wherein the self-diagnostic system is further programmed to carry out the steps of: displacing the valve body of the shut-off valve so as to start closing the shut-off valve; recording the pressures measured by the pressure sensors upstream and downstream of the shut-off valve; stopping displacing the valve body when the pressure difference across the shut-off valve is greater then a predefined limit and the upstream pressure is greater than the downstream pressure; and then re-opening the shut-off valve.

6. The over-pressure protection system according to claim 4, wherein the self-diagnostic system is further programmed to carry out the steps of: causing the actuator to displace the valve body of the shut-off valve; comparing the displacement of the valve body and power supplied to the actuator with the expected displacement and power; and giving a signal if either the displacement or the power is not as expected.

7. The over-pressure protection system according to claim 6, wherein displacing the valve body of the shut-off valve is done over part of the stroke of the valve body.

8. The over-pressure protection system according to claim 6, wherein displacing the valve body of the shut-off valve is done over the full stroke of the valve body.

9. The over-pressure protection system according to claim 5, wherein the self-diagnostic system is further programmed to carry out the steps of: causing the actuator to displace the valve body of the shut-off valve; comparing the displacement of the valve body and power supplied to the actuator with the expected displacement and power; and giving a signal if either the displacement or the power is not as expected.

10. The over-pressure protection system according to claim 2, wherein the self-diagnostic system is programmed to carry out, when the shut-off valve is fully open, the steps of: measuring continuously the pressures with the pressure sensors; calculating the pressure difference; and giving a signal if the difference is greater than a predefined limit.

11. The over-pressure protection system according to claim 3, wherein the self-diagnostic system is programmed to carry out, when the shut-off valve is fully open, the steps of: measuring continuously the pressures with the pressure sensors; calculating the pressure difference; and giving a signal if the difference is greater than a predefined limit.

* * * * *